United States Patent
Nam

(10) Patent No.: US 6,335,508 B1
(45) Date of Patent: Jan. 1, 2002

(54) PIPE HANDLING SYSTEM FOR LASER AND OTHER PIPE TREATING PROCESSES

(76) Inventor: Kyong H. Nam, #18. 1757 Honeyman Street, Delta, British Columbia (CA), V4G 1E2

(*) Notice: Subject to any disclaimer, the term of this patent is extended or adjusted under 35 U.S.C. 154(b) by 0 days.

(21) Appl. No.: 09/577,937

(22) Filed: May 25, 2000

(51) Int. Cl.$^7$ .............................................. B23K 26/00
(52) U.S. Cl. ................................. 219/121.67; 219/161
(58) Field of Search ..................... 219/121.67, 121.68, 219/121.69, 121.39, 121.4, 121.41, 161, 60 A; 29/56.6

(56) References Cited

U.S. PATENT DOCUMENTS

| | | | | |
|---|---|---|---|---|
| 3,013,925 A | * | 12/1961 | Larsen | |
| 3,614,077 A | * | 10/1971 | Blackburn | |
| 3,823,883 A | * | 7/1974 | Fencl et al. | |
| 3,936,714 A | * | 2/1976 | Marshall et al. | |
| 4,052,039 A | * | 10/1977 | Koyano et al. | |
| 4,349,182 A | * | 9/1982 | Blackburn | |
| 4,364,171 A | * | 12/1982 | Niemann | |
| 4,384,901 A | * | 5/1983 | Swoboda, III et al. | |
| 4,480,821 A | * | 11/1984 | Noll et al. | |
| 4,659,903 A | * | 4/1987 | Berne et al. | |
| 5,886,314 A | * | 3/1999 | Sims | ...................................... |

* cited by examiner

Primary Examiner—Tom Dunn
Assistant Examiner—Jonathan Johnson
(74) Attorney, Agent, or Firm—Oyen Wiggs Green & Mutala

(57) ABSTRACT

The invention provides a pipe handling system which can transform a flat XY cutting system into a pipe cutting system which maintains very accurate pipe positions for laser, plasma, mechanical or other material processes, regardless of distortions in the pipe. The invention also provides a pipe handling system which can accommodate longer pipes, and a large range of pipe diameters. The pipe handling system is simpler, lighter and much more economical than conventional pipe handling systems.

4 Claims, 4 Drawing Sheets

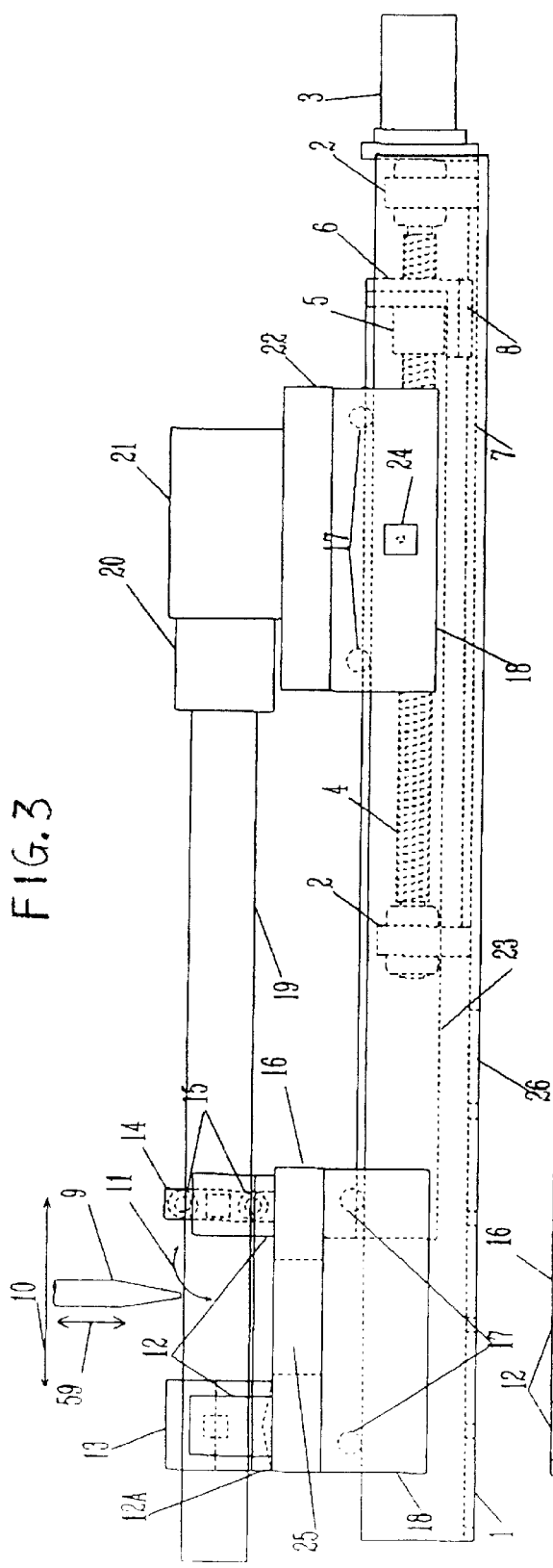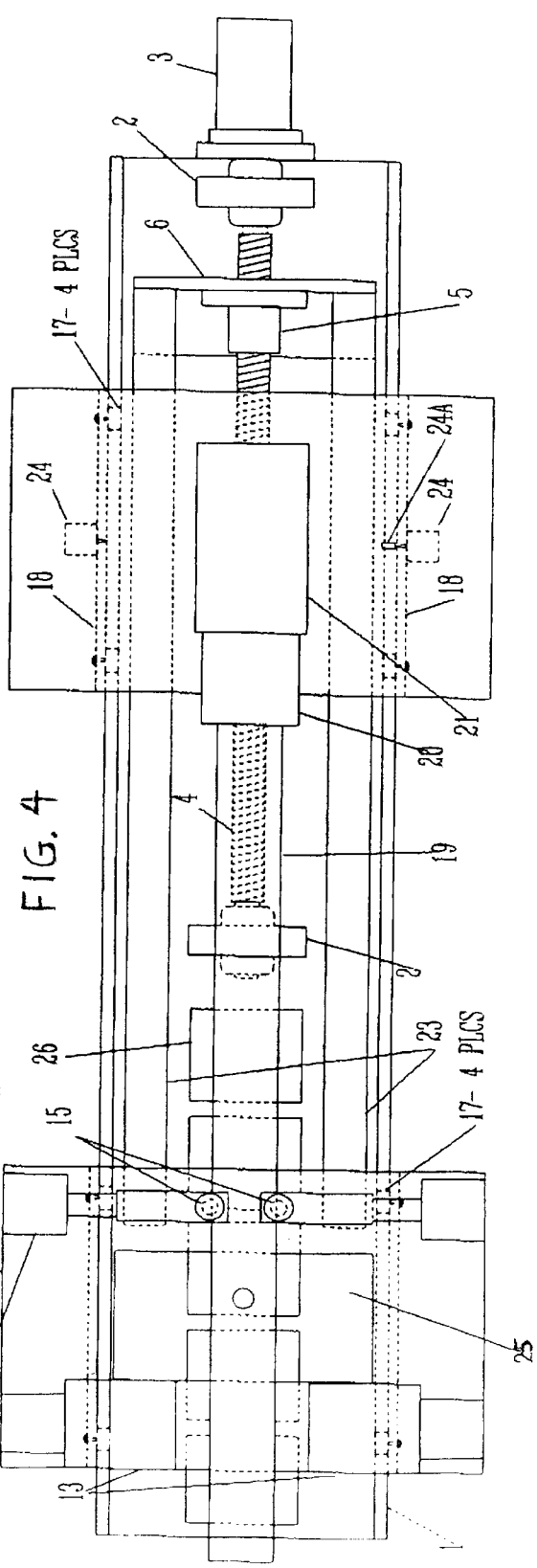

PIPE HANDLING SYSTEM FOR LASER AND OTHER PIPE TREATING PROCESSES

FIELD OF THE INVENTION

The present invention pertains to laser processing systems. More specifically, the invention relates to an improved laser pipe handling and cutting system.

BACKGROUND OF THE INVENTION

The use of lasers in the processing of materials has become widespread in the past two to three decades. Among other things, lasers are used to cut pipe, both longitudinally and laterally.

Currently, there are a number of systems that can be used for laser cutting pipe in a longitudinal direction. One type of laser pipe cutting system uses an XY (lateral and longitudinal) table, and a stationary third axis with a rotating chuck. The maximum length of pipe that this laser cutting system can cut is limited to the maximum stroke of its XY table.

Another laser pipe cutting system has an XY table and a stationary third axis with a hollow power chuck and a pipe feeding mechanism. This system with the hollow chuck can accommodate longer lengths of pipe.

Both of these systems have an inherent pipe cutting accuracy deficiency. This is because the laser cutting takes place between two pipe supporting mechanisms, which are remote from the laser pipe cutting head. Since pipe stocks are not perfectly straight, especially when the pipe walls are thin, the pipe is distorted and accurate cutting cannot take place over the whole length of the pipe.

Normally, in laser pipe cutting, the laser beam is directed downwardly perpendicular to the pipe centerline. This is true, except in those cases where there is special angle pipe cutting. The following discussion applies to vertical laser cutting. Because a curved or bent pipe is inherently supported by two pipe supported locations only, the pipe tends to sway from the cutting centerline (a line scribed by the laser cutting head movement along the length of the pipe). This results in untrue or deformed cut patterns, for example, holes cut at one side of the pipe are larger than the holes cut at the other side.

A third laser pipe cutting system, which is dedicated to pipe cutting only, eliminates the XY flat cutting table. In this system, the pipe to be cut is held by a rotating pipe holder with rollers, and is linearly moved and rotated by two motors under a fixed laser pipe cutting head to generate the cutting patterns into the pipe. This system may cut pipes accurately but it loses the versatility of cutting flat materials.

Other common problems with existing laser pipe cutting systems are that hollow power chucks that can accommodate large diameter pipe are very bulky, heavy and expensive. Furthermore, the oversize chuck hole size has small tolerances which confines the machinable pipe diameters to a small range for the particular chuck.

SUMMARY OF INVENTION

This invention provides a pipe handling system which can transform an XY flat cutting system into a pipe cutting system and maintain very accurate pipe positions for laser, plasma, mechanical or other pipe material processes, even with reasonable distortions in the pipe. The invention also provides a pipe handling system which can accommodate longer pipes, and a large range of pipe diameters. The pipe handling system is simple, lightweight and more economical than conventional pipe handling systems.

The rails can have holes therein to enable cut scraps to pass. The pipe grabbers can have soft pipe contacting linings. The system can include a laser for cutting the pipe.

The invention in one aspect is directed to a pipe handling and XY laser cutting system comprising: (a) a frame; (b) a laser pipe cutting head associated with the XY laser cutting system and its frame; (c) a first carriage for longitudinal travel in relation to the frame, said carriage holding the laser pipe cutting head; (d) a second pipe holding carriage associated with the frame and pipe cutting head carriage, said pipe holding frame carriage having members which hold a pipe at opposite radial locations relative to the cutting head, said carriage being capable of travelling in a longitudinal direction in relation to the frame; (e) a third chuck carriage assembly associated with the pipe holding carriage, capable of longitudinal movement in relation to the frame, said chuck carriage assembly being adapted to engage one end of a pipe and impart rotational movement thereto; and (f) a computer which is associated with the first, second and third carriage assemblies, said computer coordinating longitudinal, rotational pipe movement, and longitudinal position of the second pipe holding carriage in relation to the laser cutting head.

The members which hold the pipe can be moved by air cylinders. The second pipe holding carriage assembly and the third chuck carriage assembly can move on parallel longitudinally extending rails which can be associated with the frame.

A pair of the members holding the pipe can be bearing yokes which can be controlled by air cylinders. The chuck carriage can be driven by a computer controlled motor.

The system can include a pair of chuck carriage stoppers for maintaining pipe in a fixed position while being cut by the laser cutting head. The system can also include a linear actuator system associated with the parallel rails and connected to the control computer by a motor for generating longitudinal movements to the second carriage assembly.

The invention also pertains to a method of cutting pipe which comprises a first pair of pipe grabbers located on a first side of a laser pipe cutting head, a second pair of pipe holders located on a second side of a laser pipe cutting head, a chuck connected to an end of the pipe for imparting rotational movement to the pipe relative to the laser cutting head; and moving the first pipe grabbers and the second pipe holders in association with movement of the laser cutting head along the length of the pipe, and maintaining respective positions on first and second sides of the laser cutting head.

The movements of the first pipe grabber, the second pipe holder, rotational movement of the pipe, and longitudinal movement of the pipe cutting head can be controlled by a computer.

The invention also pertains to an adapter sleeve, which has internal surfaces comprising a plurality of rollers which ride on materials such as rectangular and square pipes or angles. The adapter sleeve has a circular outside surface which is held by the second pair of pipe holders for cutting such materials.

In a specific embodiment, the invention is directed to an XVW axis pipe handling system comprising: (a) a pair of parallel rails arranged in a channel form along an X axis; (b) a linear actuator system associated with the parallel rails and connected to the third axis of a control computer by a motor for generating linear movements in parallel to movements along the X axis; (c) a transfer linkage for transmitting the movement of the linear actuator system to a cutting carriage plate; (d) a cutting carriage plate for mounting thereon carriage brackets and air cylinder adapter brackets; (e) a pair of carriage brackets integral to said cutting carriage plate for mounting track rollers; (f) a plurality of track rollers for said cutting carriage assembly for enabling the carriage assembly to ride on said channel rails; (g) a pair of air cylinder adapter plates for adjusting the gap of a bearing yoke by means of adjusting screws for handling a large range of pipe diameters; (h) a pair of air cylinders, each having thereon a pipe grabber; (i) a pair of air cylinders, each having a bearing yoke with a pair of ball transfer pipe bearings for holding and transporting the pipe; (j) a chuck carriage plate for mounting a pair of carriage brackets and a V motor; (k) a pair of carriage brackets integral to said chuck carriage plate for mounting track rollers; (l) a plurality of track rollers for said chuck carriage assembly to enable the carriage to ride on said channel rails; (m) a pair of chuck carriage stoppers for maintaining pipe in a fixed position while being cut; and (n) a position sensor for detecting a correct pipe and carriage position signal for the control computer.

BRIEF DESCRIPTION OF DRAWINGS

In drawings which illustrate specific embodiments of the invention, but which should not be construed as restricting the spirit or scope of the invention in any way:

FIG. 3 is a detailed front view of the XVW laser pipe processing system, according to the invention.

FIG. 4 is a detailed top view of the XVW laser pipe processing system, according to the invention.

DETAILED DESCRIPTION

Figure 1:
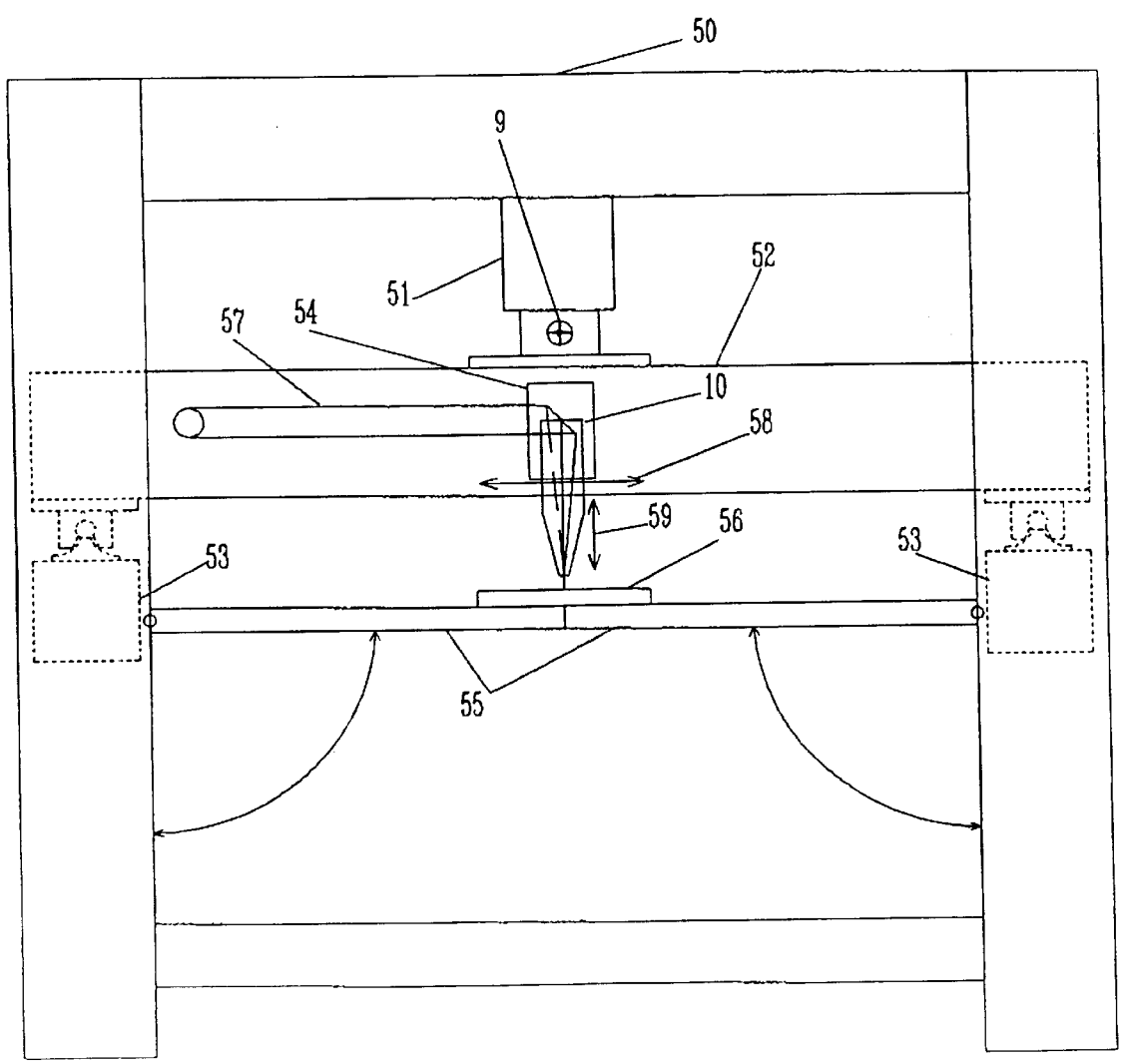
FIG. 1 is a diagrammatic side view taken in the X (longitudinal) direction of a typical embodiment of an XYZ (longitudinal, lateral, vertical) laser processing system for flat materials, according to the prior art.

Referring to the drawings, FIG. 1 shows a diagrammatic side view taken in the X (longitudinal) direction of a typical embodiment of XYZ (longitudinal, lateral, perpendicular axes) laser processing system for flat materials. Specifically, FIG. 1 shows, looking in the X direction, the XY laser cutting system with overall table frame 50, X linear actuator 51, X carriage (Y linear actuator) 52, X linear guides 53, Y carriage 54, table bed 55, laser cutting head 10 and to be laser cut material 56. FIG. 1 also shows the direction 9 of the X carriage movement (a cross in a circle), Y carriage movement 58 (horizontal arrows), Z direction laser cutting head movement 59 (vertical arrows), and Y direction horizontal laser beam 57. The horizontal lateral laser beam 57 is reflected downward in the Z direction by a mirror (not numbered) and focused by a lens in Laser cutting head 10 downwardly onto the material 56 to be laser processed. Laser cutting head 10, riding on Y carriage 54 which is embedded in the X carriage 52 of the XY table, is capable of performing a wide series of modes of motion including linear, circular interpolation and contouring, as controlled by a computer (not shown) and X and Y servo motors (not shown). These components are known in the art.

Laser Pipe Handling System

Figure 2:
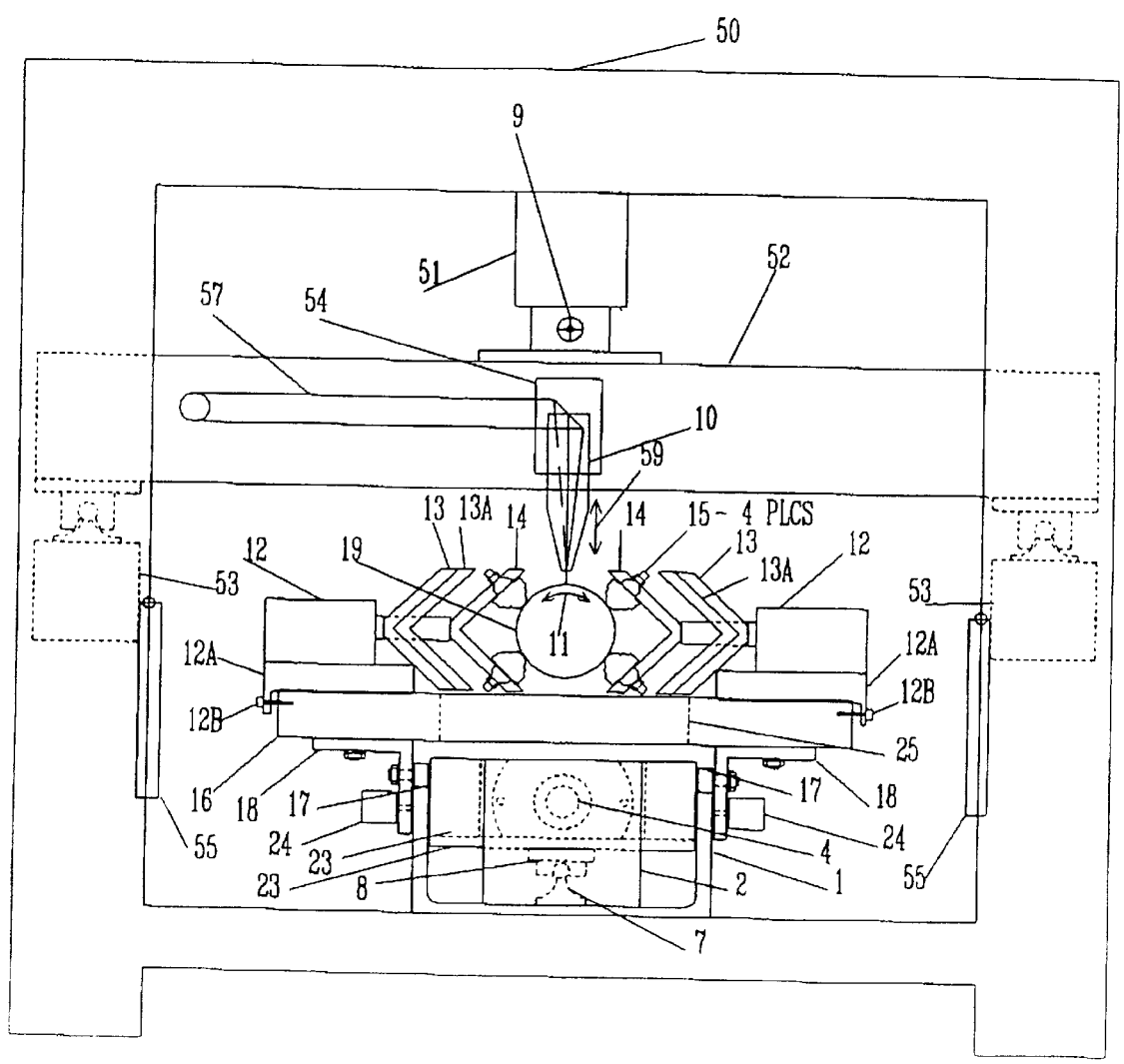
FIG. 2 is a diagrammatic side view taken in the X (longitudinal) direction of an embodiment of an XVW (longitudinal, rotational, translational) laser pipe processing system, according to the subject invention.

FIG. 2 shows a diagrammatic side view taken in the X direction of a specific embodiment of the pipe handling system (PHS) according to the invention. This embodiment, among other uses, is used in laser pipe cutting sytems To accommodate the PHS, the table bed 55 of a conventional system (as seen in FIG. 1) is cut into segments along the X direction 9 of the XY table and hinged down so they lie against the interiors of the respective lower sides of the XY table frame 50. The Y carriage 54 is secured to stop any linear Y (lateral) movement by it and is replaced with rotational Y movement (see arrows 11) of the pipe 19 to be processed. These specific modifications make it possible for a flat cutting system to be transformed into a pipe cutting system, and vice versa.

The component parts of the PHS shown in FIG. 2 making up the system are an X axis longitudinal channel rail 1, linear actuator support 2, pipe transfer linear actuator 4, ball nut bracket 6 (see FIG. 3), pipe transfer X linear guide 7, X linear guide bearing unit 8, double acting air cylinder 12, air cylinder adapter plate 12A, adjusting screw 12B, pipe grabber 13 with soft lining 13a, bearing yoke 14, pipe bearings 15, cutting carriage plate 16 with discharge hole 25, track rollers 17, carriage bracket 18, pipe material 19 with its rotational direction of movement 11 (shown by arrows), transfer linkage 23 and chuck carriage stopper 24.

FIG. 3 shows a front view of the PHS according to the invention. FIG. 4 shows a top view of the PHS according to the invention. These two views show most of the component parts of the PSH as discussed previously in association with FIG. 2 from different angles. The parts not shown in FIG. 2 are the pipe transfer linear actuator motor 3, ball nut 5, chuck 20, chuck motor 21, and chuck carriage plate 22.

Figure 5:
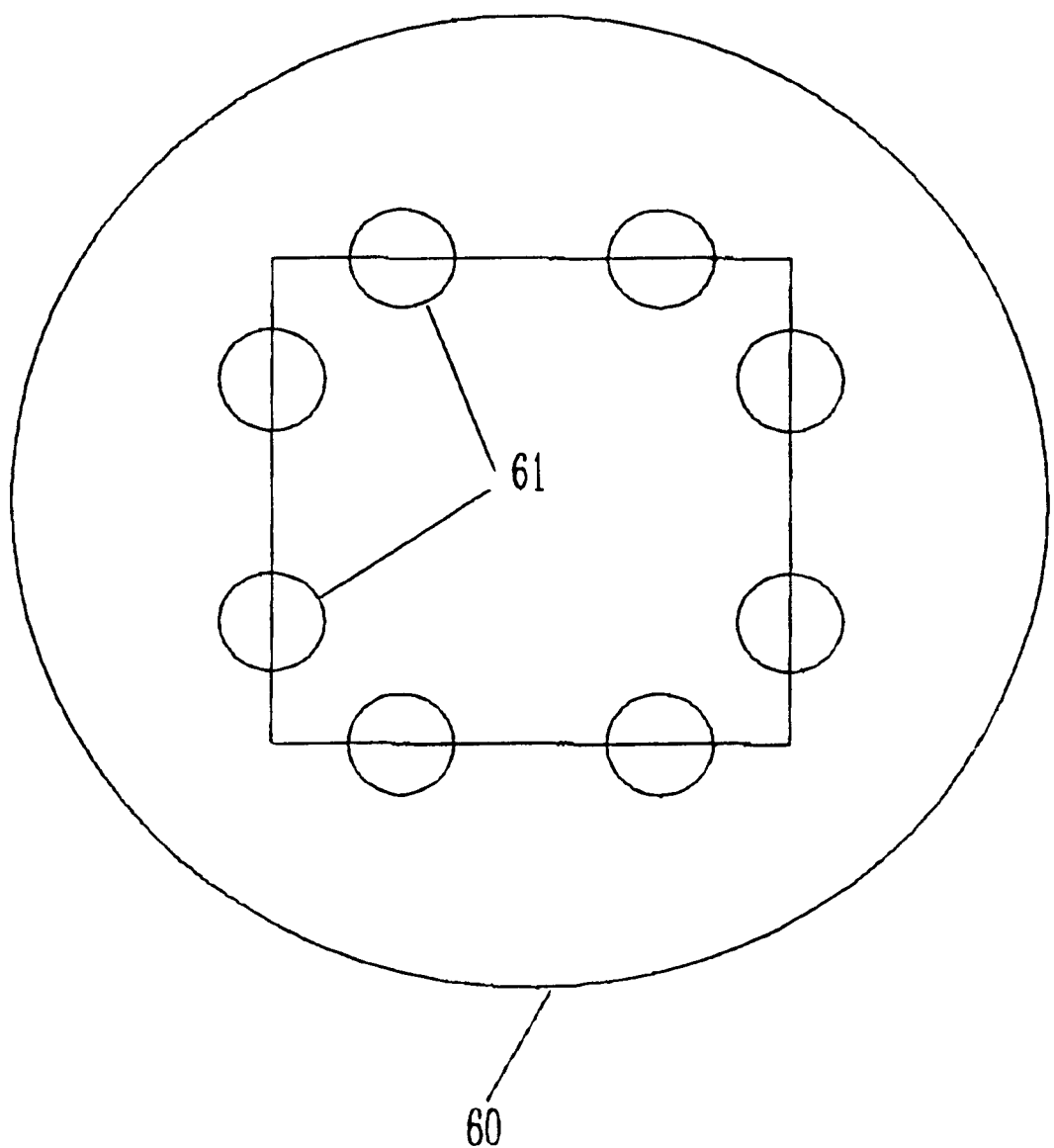
FIG. 5 is a diagrammatic view of an adapter sleeve, according to the invention.

FIG. 5 shows a diagrammatic view of the adapter sleeve according to the invention. It comprises a sleeve body 60 and a plurality of adjusting transfer bearings 61.

Operation of Laser Pipe Handling System

The operation of the laser pipe cutting system equipped with the PHS according to the invention is explained as follows. It should be clearly understood, however, that the application of the PHS is not limited to laser pipe cutting. It can be used with many kinds of material processing including cutting, welding, scribing, machining and other processes with minimal modifications.

Referring to FIG. 2, and as referred to previously, the nozzle movement 58 in the Y direction of the XY cutting table (see FIG. 1) is disabled by disconnecting the Y motor (not shown) from the control computer (not shown). The Y carriage 54 carrying the laser pipe cutting head 10 is secured to the X carriage 52 to allow X movement 9 only. The laser pipe cutting head 10 located above the pipe 19 being cut moves in the X direction on X linear guide 53 in parallel to the centerline of the pipe 19. The chuck motor 21 (see FIG. 3), which is now connected to the Y terminal of the control computer in place of the cutting table generates rotational motion to the pipe 19 (see arrows 11 in FIG. 2) through chuck 20 (see FIG. 3) thereby transforming the normal horizontal flat XY motion into quasi 3-D cutting motion. A 2-D CAM (Computer Aided Manufacturing) program instructs the laser cutting system to work according to XVW processing.

By maintaining two bearing yokes 14 with four pipe bearings 15 within several inches from the laser pipe cutting location, the patterns cut on the pipe are very accurate because the pipe 19, even if it is bent or curved, cannot, due to the close support, sway very far out of position. As pipe cutting progresses along the length of the pipe in the X (longitudinal) direction, the cutting carriage assembly, comprising cutting carriage plate 16, air cylinder adapter plates 12A, adjusting screws 12B, four air cylinders 12, two equipped with pipe grabber 13 and two equipped with bearing yokes 14, four tack rollers 17 (see FIG. 3) and two carriage brackets 18, advances the same distance as the laser pipe cutting head moves. This distance is equivalent to the spacing between two patterns when repeated pattern cutting is performed. Thus the distance between the laser cutting spot on the pipe and the bearing yokes is maintained the same throughout the whole cutting process thereby achieving high accuracy cutting.

To move the cutting carriage assembly in coordination with the laser cutting spot or the advancement of the laser pipe cutting head 10, a pipe transfer linear actuator motor 3 (see FIG. 3) is incorporated as a W axis driver. This motor 3, which is controlled by the Z axis command of the control computer (not shown), drives the pipe transfer linear actuator 4 to move the pipe cutting carriage plate 16 via the transfer linkage 23 connected to the ball nut 5 and the ball nut bracket 6. After cutting to the proximity length of the maximum travel of the laser pipe cutting head 10, the pipe grabber 13 grabs the pipe 19 and releases the chuck carriage stoppers 24. Now, the chuck carriage assembly, consisting of a chuck carriage plate 22, chuck 20, chuck motor 21, two chuck carriage brackets 18, four track rollers 17 and two chuck carriage stoppers 24, are physically connected to the cutting carriage assembly. The resulting combination of mechanisms, including the chuck carriage assembly and its associated parts, the cutting carriage assembly and its associated parts, the transfer linkage 23, ball nut 5, ball nut bracket 6 and the linear guide bearing 7, moves in unison in a group a distance equal to advancement of the laser pipe cutting head 10 to a new position. Arriving at a new position, the pipe grabber 13 releases the pipe 19 and the chuck carriage stopper 24 engages into the wall of the channel rail 1 and secures the chuck carriage plate 22 at the new position for the next pipe cutting operation. The chuck carriage stopper 24 engages with a sensor (not shown) which sends a signal to the control computer that the system is set at the correct location for the next pipe cutting operation. In the absence of this signal, the subsequent pipe cutting operation cannot be commenced and there is no danger that the cutting operation will start at an incorrect location.

For rigidity and stability, the pipe transfer linear guide 7 is mounted under the pipe transfer linear actuator 4, and the ball nut 5 and ball nut bracket 6 are mounted onto the linear guide bearing unit 8. For smooth movement, the chuck carriage and cutting carriage assemblies are equipped with four track rollers 17 each, which respectively ride on the channel rail 1. To enable the scraps cut from the pipe to fall freely to the floor and not interfere with the pipe cutting process, the cutting carriage plate 16 has a through hole 25 and the channel rail 1 has a series of through holes covering the full range of movement of the laser pipe cutting head 10. Ball transfers are selected for the pipe bearings 15 because they are subjected to both linear and rotational movements. Two air cylinder adapter plates 12A, each having two air cylinders 12, one for pipe grabber 13, the other for bearing yoke 14, are adjusted in and out opposite each other by adjusting screws 12B to accommodate different pipe diameters. Air cylinders 12 are adapted for mounting bearing yokes 14 to handle pipes that are slightly deformed, dented, protruded, or have localized irregularities in pipe diameter, and the like, which cannot be readily handled by conventional mechanical or hydraulic actuators. The soft linings 13a of the pipe grabbers 13 in conjunction with the air cylinders 12 guarantees that no damage is caused to the pipe 19 in the process of its grabbing and pulling by the pipe grabber 13.

To enable the system to process rectangular and square pipes and angles, an adapter sleeve 60 with a plurality of internal adjusting transfer bearings 61 in a round body is provided, as shown in FIG. 5. The adjusting transfer bearings 61 centre the rectangular pipe or angle, as the case may be, in the adapter sleeve 60. The exterior of the sleeve 60 in turn is held by the second pair of pipe holders and is processed in the same way as round pipe.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A pipe handling system comprising:

(a) a control computer;

(b) a laser cutting head;

(c) a pair of parallel rails arranged in a longitudinal axis;

(d) a linear actuator system associated with the parallel rails and connected to a third axis of the control computer by a motor for generating lateral movements in association with movements along the longitudinal axis;

(e) a transfer linkage for transmitting movement of the linear actuator system to a pipe cutting carriage plate;

(f) a cutting carriage assembly for mounting thereon carriage brackets and air cylinder adapter brackets;

(g) a pair of carriage brackets integral to the cutting carriage assembly for mounting track rollers;

(h) a plurality of track rollers for the cutting carriage assembly for enabling the carriage assembly to ride longitudinally on the parallel rails;

(i) a pair of air cylinder adapter plates for adjusting the gap of a bearing yoke by means of air cylinders for handling a range of pipe diameters;

(j) a pair of air cylinders, each having thereon a pipe grabber for holding pipe;

(k) a pair of air cylinders, each having thereon a bearing yoke with a pair of ball transfer pipe bearings for holding pipe;

(l) a chuck carriage assembly for mounting a pair of carriage brackets and a lateral motor;

(m) a pair of carriage brackets integral to the chuck carriage plate for mounting track rollers;

(n) a plurality of track rollers for the chuck carriage assembly for enabling the chuck carriage assembly to ride on the parallel rails;

(o) a pair of chuck carriage stoppers for maintaining a pipe in a fixed position while being cut by the laser cutting head; and (p) a position sensor for detecting correct pipe and carriage position and sending a signal to the control computer.

2. A system as claimed in claim 1 wherein the rails have holes therein to enable cut metal scraps to pass.

3. A system as claimed in claim 1 wherein the pipe grabbers have soft pipe contacting linings.

4. A system as claimed in claim 1 including a hollow cylindrical adapter sleeve with internal adjusting transfer bearings.

\* \* \* \* \*